United States Patent
Apuzzo, II

(10) Patent No.: US 11,583,049 B2
(45) Date of Patent: Feb. 21, 2023

(54) COLLAPSIBLE LAPTOP BAG

(71) Applicant: Joseph Anthony Apuzzo, II, New City, NY (US)

(72) Inventor: Joseph Anthony Apuzzo, II, New City, NY (US)

(*) Notice: Subject to any disclaimer, the term of this patent is extended or adjusted under 35 U.S.C. 154(b) by 33 days.

(21) Appl. No.: 17/247,005

(22) Filed: Nov. 24, 2020

(65) Prior Publication Data
US 2021/0307470 A1 Oct. 7, 2021

Related U.S. Application Data

(60) Provisional application No. 62/939,328, filed on Nov. 22, 2019.

(51) Int. Cl.
*A45C 13/02* (2006.01)
*G06F 1/16* (2006.01)

(52) U.S. Cl.
CPC .......... *A45C 13/02* (2013.01); *G06F 1/1628* (2013.01); *A45C 2013/025* (2013.01)

(58) Field of Classification Search
CPC . A45C 2013/025; A45C 13/02; A45C 7/0077; A45C 2011/003; A45C 11/00; A45C 13/04; G06F 1/1628
USPC ...... 206/320, 6, 5; 190/104; 220/666, 8, 9.3, 220/9.2; 16/221
See application file for complete search history.

(56) References Cited

U.S. PATENT DOCUMENTS

| | | | | |
|---|---|---|---|---|
| 190,360 A | * | 5/1877 | Pesinger .................. | B65D 9/10 220/9.2 |
| 204,045 A | * | 5/1878 | House ...................... | E05D 9/00 16/DIG. 29 |
| 954,918 A | * | 4/1910 | Biro ........................ | B65D 37/00 220/9.3 |
| 1,136,802 A | * | 4/1915 | Holloman .............. | B65D 37/00 220/9.2 |
| 1,647,679 A | * | 11/1927 | Williams ................ | A45C 11/02 206/8 |
| 1,848,929 A | * | 3/1932 | Berg ....................... | A45C 5/045 220/489 |
| 2,638,952 A | * | 5/1953 | Sanderson ............... | B65D 7/26 220/904 |
| 4,678,095 A | * | 7/1987 | Barnett .................... | B65D 5/36 229/199 |
| 5,494,157 A | | 2/1996 | Golenz et al. | |
| 5,570,780 A | | 11/1996 | Miller | |

(Continued)

*Primary Examiner* — Chun Hoi Cheung
(74) *Attorney, Agent, or Firm* — Dunlap Bennett & Ludwig, PLLC

(57) ABSTRACT

A collapsible laptop carriage bag. The laptop carriage bag includes a collapsible protective frame, having a first plate and a second plate carried between a plurality of arms pivotally attached between each of the first plate and the second plate. The arms are selectively extensible to position the collapsible protective frame between an extended condition and a collapsed condition. In the collapsed condition, the protective frame defines a protective cage about a portable electronic device received in an interior compartment. A bag is configured to be received within an elongate cylindrical enclosure defined by the collapsible protective frame when in the extended condition. The bag has in interior carriage space dimensioned to contain the collapsible protective frame when configured in the collapsed condition.

4 Claims, 5 Drawing Sheets

(56) References Cited

U.S. PATENT DOCUMENTS

| | | | | |
|---|---|---|---|---|
| 5,752,649 | A * | 5/1998 | Weder | B65D 5/36 47/72 |
| 5,775,497 | A * | 7/1998 | Krulik | A45C 13/36 206/583 |
| 5,881,850 | A * | 3/1999 | Murdoch | A45C 3/02 190/110 |
| 5,881,934 | A | 3/1999 | Hung | |
| 5,897,012 | A * | 4/1999 | Sortwell | B65D 19/12 220/666 |
| 5,996,882 | A * | 12/1999 | Randall | B65D 77/20 229/125.13 |
| 6,109,434 | A | 8/2000 | Howard, Jr. | |
| 6,116,418 | A | 9/2000 | Sadow | |
| 6,213,266 | B1 | 4/2001 | Hollingsworth | |
| 6,237,766 | B1 | 5/2001 | Hollingsworth | |
| 6,315,151 | B1 * | 11/2001 | Hupp | B65D 21/086 220/666 |
| 6,443,274 | B1 | 9/2002 | Klamm | |
| 6,604,618 | B1 | 8/2003 | Godshaw et al. | |
| 6,691,843 | B2 | 2/2004 | Nykoluk et al. | |
| 6,772,883 | B2 | 8/2004 | Lindamood | |
| 6,871,739 | B2 | 3/2005 | Lopez | |
| 7,216,763 | B2 | 5/2007 | Gormick et al. | |
| 7,264,116 | B2 | 9/2007 | Prentza | |
| 8,353,400 | B2 | 1/2013 | Santy et al. | |
| 8,567,578 | B2 | 10/2013 | Cuong et al. | |
| 8,596,448 | B2 * | 12/2013 | Sempe | A45C 7/0036 220/666 |
| 8,662,269 | B2 | 3/2014 | Shor et al. | |
| 2004/0011616 | A1 | 1/2004 | Rasmussen | |
| 2005/0189188 | A1 * | 9/2005 | Barnes | G06F 1/1628 190/110 |
| 2007/0159781 | A1 * | 7/2007 | Zbikowski | A47B 3/08 206/320 |
| 2009/0026197 | A1 * | 1/2009 | Chou | A45C 7/0036 220/9.2 |
| 2009/0039123 | A1 | 2/2009 | Sween et al. | |
| 2010/0051616 | A1 * | 3/2010 | Shea | B65D 81/3823 220/4.28 |

* cited by examiner

COLLAPSIBLE LAPTOP BAG

CROSS-REFERENCE TO RELATED APPLICATION

This application claims the benefit of priority of U.S. provisional application No. 62/939,328, filed Nov. 22, 2019, the contents of which are herein incorporated by reference.

BACKGROUND OF THE INVENTION

The present invention relates to a carrying case and, more particularly, to a collapsible laptop bag.

Current collapsible and packable stowaway bags do not have laptop protection. Conventional collapsible bags can hold laptops but do not protect the laptop from drops and other impact damage.

As can be seen, there is a need for a collapsible bag that protects laptops and other electronic devices.

SUMMARY OF THE INVENTION

In one aspect of the present invention, a protective carrier is disclosed. The protective carrier includes a collapsible protective frame, having a first plate and a second plate carried between a plurality of arms pivotally attached between each of the first plate and the second plate. A plurality of arms are selectively extensible to position the collapsible protective frame between an extended condition and a collapsed condition. In the collapsed condition, the first plate, the second plate, and the plurality of arms define a protective cage about an interior compartment. In the extended condition, the plurality of arms, the first plate, and the second plate define an elongate cylindrical enclosure.

In some embodiments, a bag having at least one sidewall defining an interior carriage space, an opening to the interior compartment in included. The bag has at least one carriage strap attached to the at least one sidewall configured for a user to carry the bag. The interior carriage space and the opening are dimensioned to receive the collapsible protective frame when configured in the collapsed condition.

In some embodiments, the bag is configured as a backpack.

In some embodiments, in the extended condition the first plate and the second plate are substantially perpendicular to the plurality of arms.

In some embodiments, the plurality of arms include a first segment and a second segment are pivotally coupled at first end thereof with a second end of the first segment pivotally coupled to the first plate and a second end of the second segment pivotally coupled to the second plate.

In some embodiments, a pivot pin may couple the plurality of arms to each of the first plate and the second plate. The pivot pin secures at least one of the plurality of arms to each of the first plate and the second plate are removable.

In some embodiments, when configured in the collapsed condition, a gap is defined between two adjacent arms of the plurality of arms. The gap is dimensioned to receive a portable electronic device.

In some embodiments, the portable electronic device is one of a portable computing device or a tablet computing device.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a collapsible bag that provides protection to a laptop. The present invention includes a bag that can collapse into a smaller container for travel purposes, the smaller container including protection for a laptop.

Figure 1:
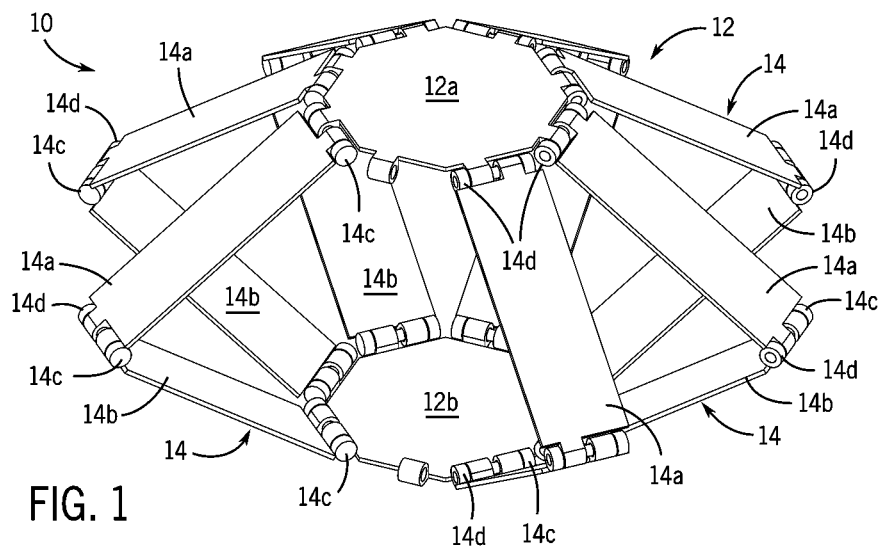
FIG. 1 is a perspective view of a collapsible protective frame.
Figure 2:
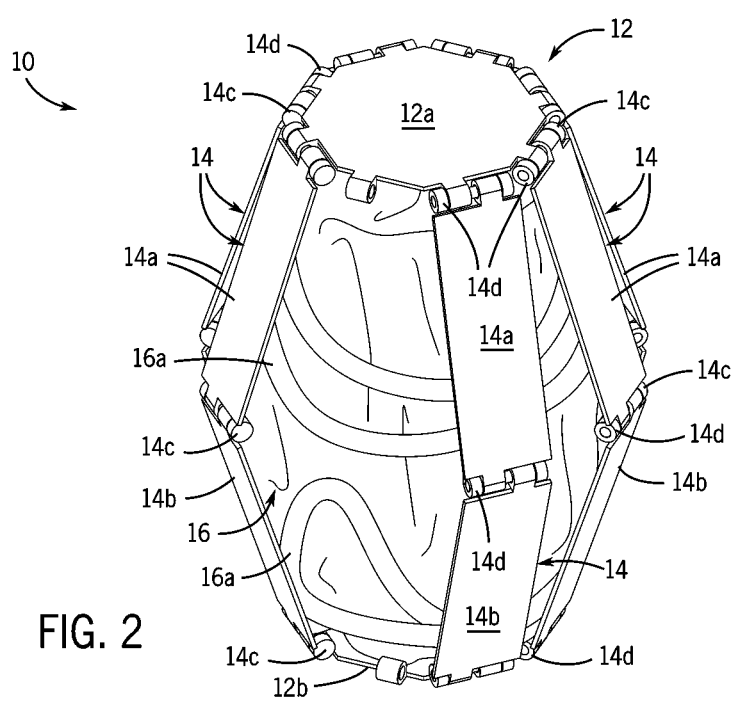
FIG. 2 is a perspective view of the collapsible laptop bag in use showing the backpack stowed inside the protector.
Figure 3:
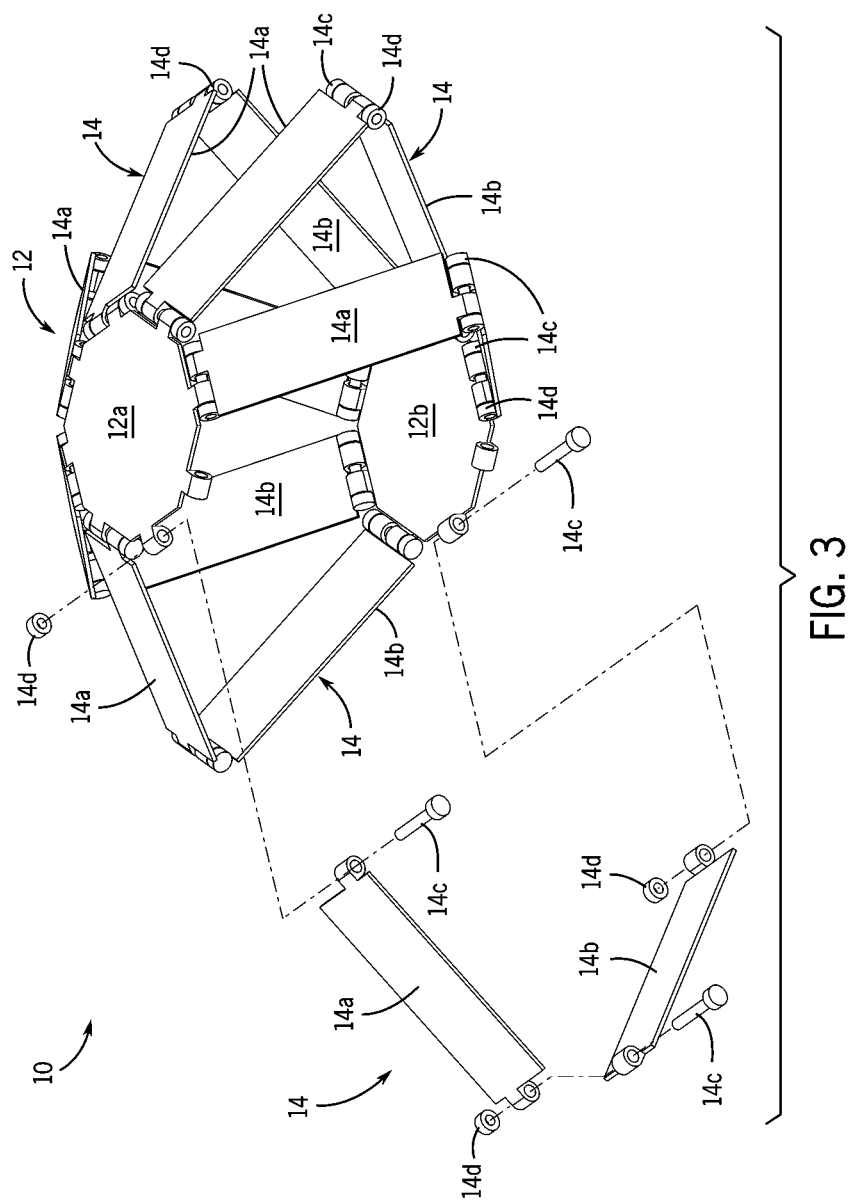
FIG. 3 is an exploded perspective view of the collapsible protective frame.
Figure 4:
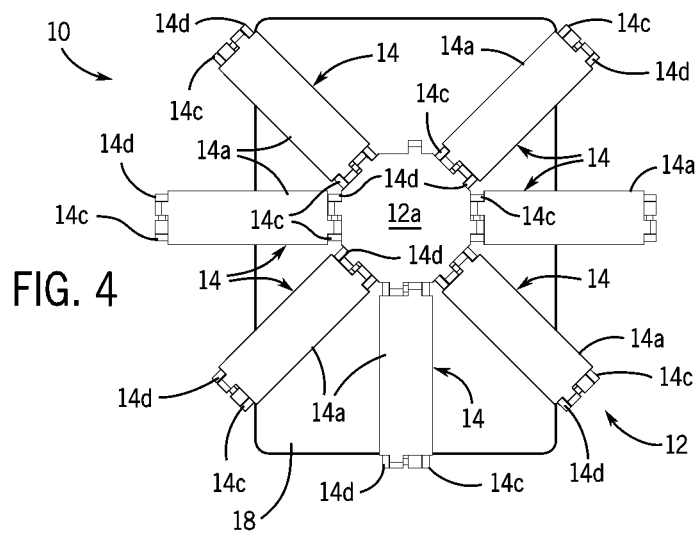
FIG. 4 is a top plan view of a collapsible protective frame. showing a laptop stowed inside the a collapsible protective frame.
Figure 5:
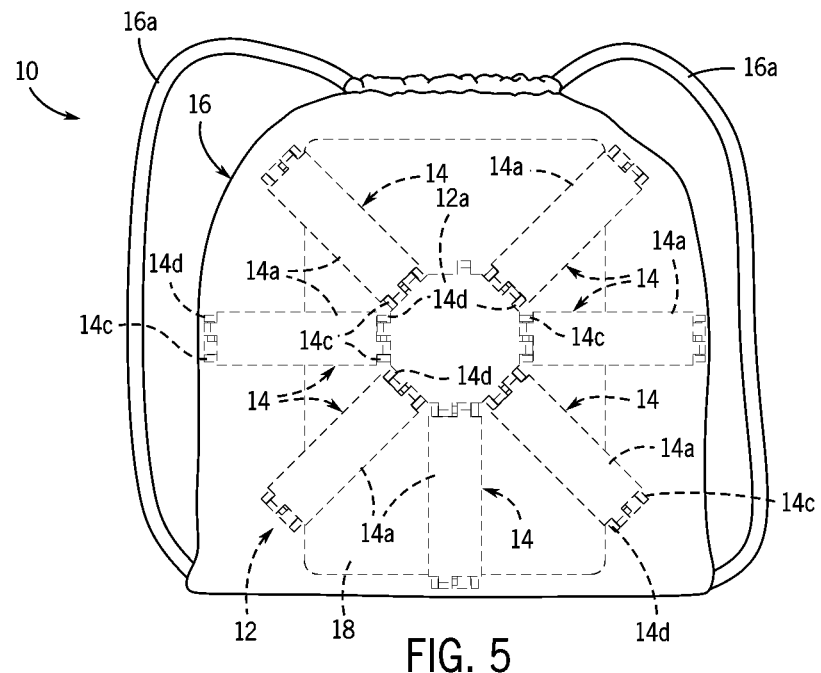
FIG. 5 is a top plan view similar to FIG. 4 showing the protector stowed inside the backpack.
Figure 6:
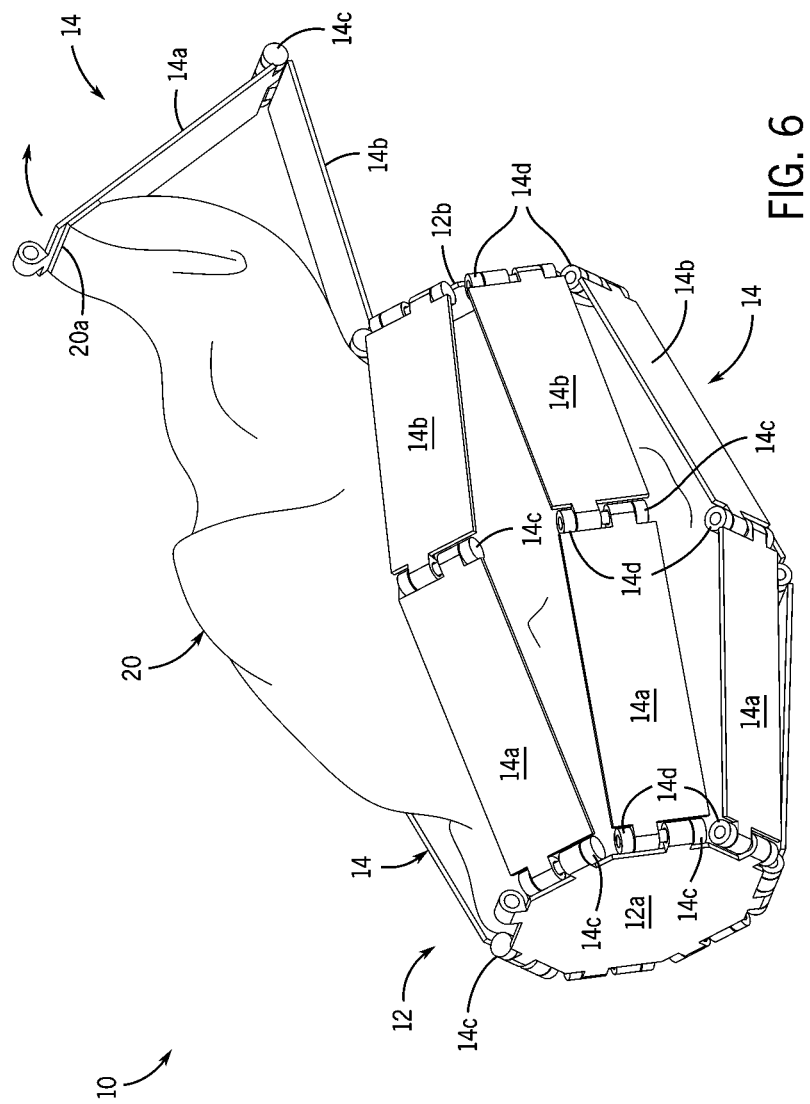
FIG. 6 is a perspective view of the collapsible protective frame in use in a second configuration showing an attached backpack inside the protector.
Figure 7:
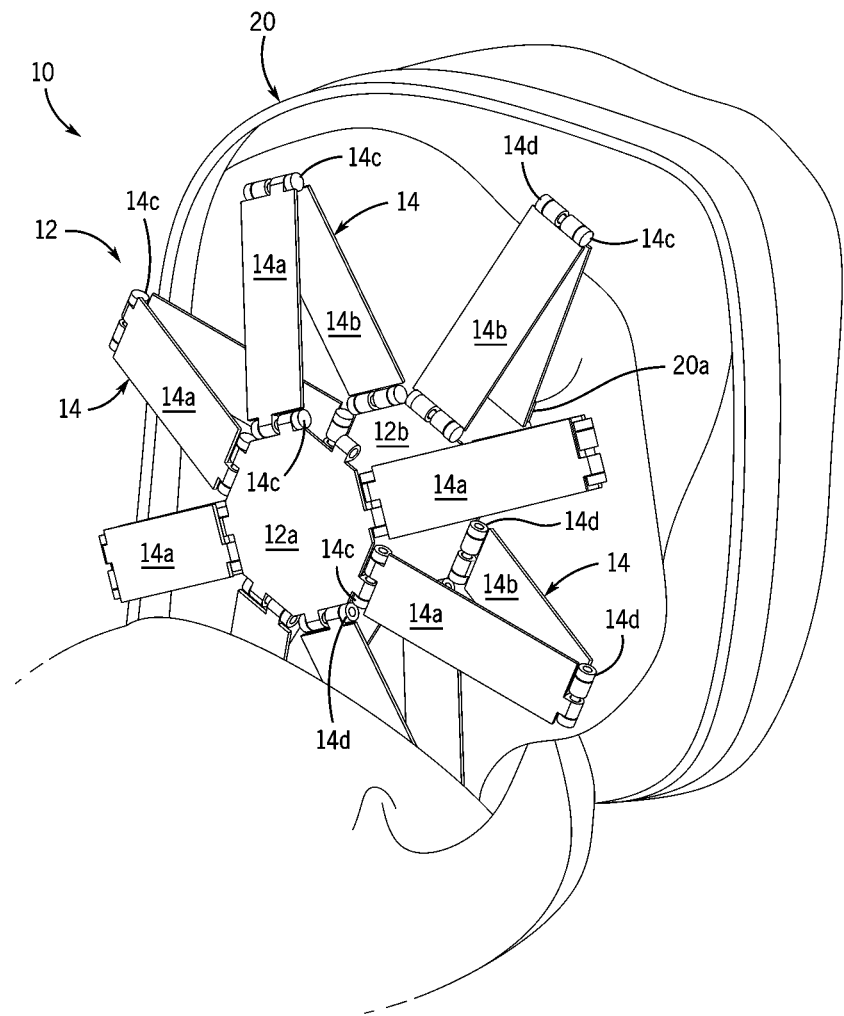
FIG. 7 is a perspective view of the collapsible protective frame in use in the second configuration showing the a collapsible protective frame inside the attached backpack.

Referring now to FIGS. 1-5, the collapsible bag, or carrier 10 includes a collapsible protective frame 12. The collapsible protective frame 12 includes a front plate 12a, a back plate 12b, and plurality of arms 14 extending therebetween. The plurality of arms 14 are selectively extensible and retractable between an extended position and a retracted position. include a first segment 14a pivotably coupled to the front plate 12a and a second segment 14b pivotably coupled to the back plate 14. The first segment 14a and the second segment 14b of each of the plurality of arms 14 may further pivot upon themselves at a central portion.

In the embodiment shown, the first segment 14a and the second segment 14b may pivot about a pivot pin 14c and a retainer 14d. As will be appreciated, any suitable pivot arrangement.

The collapsible protective frame 12 is moveable between an expanded travel configuration in which the plurality of arms 14 are extended fully, and the front plate 12a and the back plate 12b are substantially perpendicular to the plurality of arms 14. The collapsible protective frame 12 may further include a retracted position, in which the front plate 12a and the back plate 12b are pushed towards one another and the plurality of arms 14 pivot about the central portion to extend radially outwardly. When the collapsible protective frame 12 is converted to the retracted position, an internal compartment of the collapsible protective frame 12 is revealed.

The collapsible protective frame 12 may resemble an elongated octagonal cuboid in the expanded travel configuration. Therefore, one may slide a laptop, tablet, or other portable electronic device 18 within the collapsible protective frame 12 when in the retracted position. When the portable electronic device 18 is removed from the collapsible protective frame 12, the collapsible protective frame 12 may be configured in the expanded travel configuration. Since the collapsible protective frame 12 is made of a rigid or a semi-rigid material, the collapsible protective frame 12 provides a protective cage around the electronic device 18 to protect the electronic device 18 when dropped or other impact scenarios.

The portable electronic device 18 is inserted through a gap between adjacent arms 14 of the plurality of arms 14. Depending upon the dimensions of the portable electronic device, one or more of the arms 14 may be removable coupled to the collapsible protective frame 12, such as by a removable pivot pin 14c and retainer 14d so that the portable electronic device 18 may be received within the cage formed by the collapsible protective frame 12 about the portable electronic device 18.

A bag, or carrier 16 may be stored within the collapsible protective frame 12 when positioned in the extended travel configuration. The bag 16 having at least one sidewall defining an interior carriage space. When the collapsible protective frame 12 is converted into the retracted position, the bag 16 may be removed from within the internal compartment and used. The collapsible protective frame 12 may fit within the bag 16 with the collapsible protective frame 12 positioned in the retracted configuration. The bag 16 may be made of a water-resistant material.

The bag 16 may be attached to the collapsible protective frame 12 such as to one of the plurality of the arms 14. The bag 16 may them be positioned around the collapsible protective frame 12 so as to carry the collapsible protective frame 12 and portable electronic device 18, when carried. In some embodiments, the bag 16 may be positioned around the collapsible protective frame 12 by turning the bag 16 inside out, similar to a reversible garment, such that the attachment point 20a is carried within the interior carriage space of the bag 16.

In the non-limiting embodiment shown, the bag is configured as a backpack having a first carriage strap 16a and a second carriage strap 16b that extend between a top end of the carrier 16 and a bottom end of the carrier. A top opening of the carrier 16 is dimensioned to receive the portable electronic device 18 and the radially projecting first segment 14a and second segment 14b of each of the plurality of arms 14. In other embodiments, the carrier 16 may be configured as satchel, or briefcase, having firs a first carriage strap 16a and a second carriage strap 16b.

A method of making the present invention may include the following. Plastic rigid material is measured and cut to form an octagonal cylinder. The arms of the cylinder are cut in half with hinges in the middle of each, allowing it to fold into a state where a laptop can slide in. Create the bag 16 that houses the collapsible protective frame 12 in the retract position. When closed, the collapsible protective frame 12 houses the bag 16 within.

A traveler could keep their laptop in a suitcase to cut down on items to travel with. On meetings or day trip they could then use this present invention, which is travel-ready in its small design, for protection.

It should be understood, of course, that the foregoing relates to exemplary embodiments of the invention and that modifications may be made without departing from the spirit and scope of the invention as set forth in the following claims.

What is claimed is:

1. A collapsible carrier (10) configured for protectively carrying a portable electronic device (18), comprising:
   a collapsible protective frame (12) configured for carrying a portable electronic device (18), comprising:
      a first plate (12a) having a peripheral edge margin;
      a second plate (12b) having a peripheral edge margin;
      a plurality of first arm segments (14a) pivotally connected to and uniformly spaced seriatim about the peripheral edge margin of the first plate (12a), wherein each of the plurality of first art segments (14a) has a distal end portion spaced from its pivotal connection to the first plate (12a);
      a plurality of second arm segments (14b) pivotally connected to and uniformly spaced seriatim about the peripheral edge margin of the second plate (12b), wherein each of the plurality of first art segments (14b) has a distal end portion spaced from its pivotal connection to the second plate (12b), wherein the distal end portion of each of the plurality of first art segments (14a) is pivotally connected to an associated one of the distal end portions of the plurality of second arm segments (14b), wherein the first and second plates (12a, 12b) are moveable between a spaced apart configuration and a closely spaced configuration for enabling a portable electronic device (18) to be disposed therebetween, and wherein each of the plural pivotally connected first and second arm segments (14a, 14b) has a length effective for surrounding a portable electronic device (18) such that, when the plural pivotally connected distal end portions of the first and second arm segments (14a, 14b) surround the portable electronic device (18) and the first and second plates (12a, 12b) are moved to the closely spaced configuration, the plurality of first and second arm segments (14a, 14b) jointly protectively surround the portable electronic device (18) disposed between the first and second plates (12a, 12b) wherein there are eight first arm segments (14a) and eight second arm segments (14b); and
      a bag (16) dimensioned and configured for enclosing the frame (12), and wherein the bag (16) is attached to the distal end portion of one of the plurality of first arm segments (14a).

2. The collapsible carrier (10) of claim 1, further comprising a bag (16) dimensioned and configured for enclosing the frame (12), and wherein the bag (16) is attached to the distal end portion of one of the plurality of first arm segments (14a).

3. The collapsible carrier (10) of claim 2, wherein the bag (16) includes a spaced apart pair of straps (16a, 16b) dimensioned and configured for enabling the bag (16) to be worn as a backpack.

4. The collapsible carrier (10) of claim 3, wherein the bag (16) is made of a water-resistant material.

* * * * *